US008743096B2

(12) United States Patent
Nathan et al.

(10) Patent No.: US 8,743,096 B2
(45) Date of Patent: *Jun. 3, 2014

(54) STABLE DRIVING SCHEME FOR ACTIVE MATRIX DISPLAYS

(71) Applicant: Ignis Innovation Inc., Waterloo (CA)

(72) Inventors: Arokia Nathan, Cambridge (GB); Gholamreza Chaji, Waterloo (CA)

(73) Assignee: Ignis Innovation, Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,177

(22) Filed: Jun. 4, 2013

(65) Prior Publication Data

US 2013/0293602 A1 Nov. 7, 2013

Related U.S. Application Data

(63) Continuation of application No. 11/736,751, filed on Apr. 18, 2007, now Pat. No. 8,477,121.

(30) Foreign Application Priority Data

Apr. 19, 2006 (CA) ..................................... 2544090

(51) Int. Cl.
*G06F 3/038* (2013.01)
*G09G 5/00* (2006.01)

(52) U.S. Cl.
USPC .................. 345/204; 345/76; 345/82; 345/84

(58) Field of Classification Search
USPC ............... 345/76–84, 87–104, 204, 208–210; 315/169.1–169.4
See application file for complete search history.

(56) References Cited

U.S. PATENT DOCUMENTS

| | | | |
|---|---|---|---|
| 3,506,851 | A | 4/1970 | Polkinghorn et al. |
| 3,774,055 | A | 11/1973 | Bapat et al. |

(Continued)

FOREIGN PATENT DOCUMENTS

| | | |
|---|---|---|
| CA | 1 294 034 | 1/1992 |
| CA | 2 109 951 | 11/1992 |

(Continued)

OTHER PUBLICATIONS

Ahnood et al.: "Effect of threshold voltage instability on field effect mobility in thin film transistors deduced from constant current measurements"; dated Aug. 2009 (3 pages).

(Continued)

*Primary Examiner* — Michael Pervan
(74) *Attorney, Agent, or Firm* — Nixon Peabody LLP

(57) ABSTRACT

A method and system for operating a pixel array having at least one pixel circuit is provided. The method includes repeating an operation cycle defining a frame period for a pixel circuit, including at each frame period, programming the pixel circuit, driving the pixel circuit, and relaxing a stress effect on the pixel circuit, prior to a next frame period. The system includes a pixel array including a plurality of pixel circuits and a plurality of lines for operation of the plurality of pixel circuits. Each of the pixel circuits includes a light emitting device, a storage capacitor, and a drive circuit connected to the light emitting device and the storage capacitor. The system includes a drive for operating the plurality of lines to repeat an operation cycle having a frame period so that each of the operation cycle comprises a programming cycle, a driving cycle and a relaxing cycle for relaxing a stress on a pixel circuit, prior to a next frame period.

9 Claims, 10 Drawing Sheets

(56) References Cited

U.S. PATENT DOCUMENTS 4,090,096 A 5/1978 Nagami
4,160,934 A 7/1979 Kirsch
4,354,162 A 10/1982 Wright
4,758,831 A 7/1988 Kasahara et al.
4,943,956 A 7/1990 Noro
4,963,860 A 10/1990 Stewart
4,975,691 A 12/1990 Lee
4,996,523 A 2/1991 Bell et al.
5,051,739 A 9/1991 Hayashida et al.
5,153,420 A 10/1992 Hack et al.
5,198,803 A 3/1993 Shie et al.
5,204,661 A 4/1993 Hack et al.
5,222,082 A 6/1993 Plus
5,266,515 A 11/1993 Robb et al.
5,489,918 A 2/1996 Mosier
5,498,880 A 3/1996 Lee et al.
5,572,444 A 11/1996 Lentz et al.
5,589,847 A 12/1996 Lewis
5,619,033 A 4/1997 Weisfield
5,648,276 A 7/1997 Hara et al.
5,670,973 A 9/1997 Bassetti et al.
5,686,935 A 11/1997 Weisbrod
5,691,783 A 11/1997 Numao et al.
5,712,653 A 1/1998 Katoh et al.
5,714,968 A 2/1998 Ikeda
5,723,950 A 3/1998 Wei et al.
5,744,824 A 4/1998 Kousai et al.
5,745,660 A 4/1998 Kolpatzik et al.
5,747,928 A 5/1998 Shanks et al.
5,748,160 A 5/1998 Shieh et al.
5,784,042 A 7/1998 Ono et al.
5,790,234 A 8/1998 Matsuyama
5,815,303 A 9/1998 Berlin
5,870,071 A 2/1999 Kawahata
5,874,803 A 2/1999 Garbuzov et al.
5,880,582 A 3/1999 Sawada
5,903,248 A 5/1999 Irwin
5,917,280 A 6/1999 Burrows et al.
5,923,794 A 7/1999 McGrath et al.
5,945,972 A 8/1999 Okumura et al.
5,949,398 A 9/1999 Kim
5,952,789 A 9/1999 Stewart et al.
5,952,991 A 9/1999 Akiyama et al.
5,982,104 A 11/1999 Sasaki et al.
5,990,629 A 11/1999 Yamada et al.
6,023,259 A 2/2000 Howard et al.
6,069,365 A 5/2000 Chow et al.
6,091,203 A 7/2000 Kawashima et al.
6,097,360 A 8/2000 Holloman
6,144,222 A 11/2000 Ho
6,177,915 B1 1/2001 Beeteson et al.
6,229,506 B1 5/2001 Dawson et al.
6,229,508 B1 5/2001 Kane
6,232,939 B1 5/2001 Saito et al.
6,246,180 B1 6/2001 Nishigaki
6,252,248 B1 6/2001 Sano et al.
6,259,424 B1 7/2001 Kurogane
6,262,589 B1 7/2001 Tamukai
6,271,825 B1 8/2001 Greene et al.
6,274,887 B1 8/2001 Yamazaki et al.
6,288,696 B1 9/2001 Holloman
6,300,928 B1 10/2001 Kim
6,303,963 B1 10/2001 Ohtani et al.
6,304,039 B1 10/2001 Appelberg et al.
6,306,694 B1 10/2001 Yamazaki et al.
6,307,322 B1 10/2001 Dawson et al.
6,310,962 B1 10/2001 Chung et al.
6,316,786 B1 11/2001 Mueller et al.
6,320,325 B1 11/2001 Cok et al.
6,323,631 B1 11/2001 Juang
6,323,832 B1 11/2001 Nishizawa et al.
6,345,085 B1 2/2002 Yeo et al.
6,356,029 B1 3/2002 Hunter
6,365,917 B1 4/2002 Yamazaki
6,373,453 B1 4/2002 Yudasaka
6,373,454 B1 4/2002 Knapp et al.
6,384,427 B1 5/2002 Yamazaki et al.
6,392,617 B1 5/2002 Gleason
6,399,988 B1 6/2002 Yamazaki
6,414,661 B1 7/2002 Shen et al.
6,417,825 B1 7/2002 Stewart et al.
6,420,758 B1 7/2002 Nakajima
6,420,834 B2 7/2002 Yamazaki et al.
6,420,988 B1 7/2002 Azami et al.
6,433,488 B1 8/2002 Bu
6,437,106 B1 8/2002 Stoner et al.
6,445,369 B1 9/2002 Yang et al.
6,445,376 B2 9/2002 Parrish
6,468,638 B2 10/2002 Jacobsen et al.
6,475,845 B2 11/2002 Kimura
6,489,952 B1 12/2002 Tanaka et al.
6,501,098 B2 12/2002 Yamazaki
6,501,466 B1 12/2002 Yamagishi et al.
6,512,271 B1 1/2003 Yamazaki et al.
6,518,594 B1 2/2003 Nakajima et al.
6,522,315 B2 2/2003 Ozawa et al.
6,524,895 B2 2/2003 Yamazaki et al.
6,525,683 B1 2/2003 Gu
6,531,713 B1 3/2003 Yamazaki
6,531,827 B2 3/2003 Kawashima
6,542,138 B1 4/2003 Shannon et al.
6,559,594 B2 5/2003 Fukunaga et al.
6,573,195 B1 6/2003 Yamazaki et al.
6,573,584 B1 6/2003 Nagakari et al.
6,576,926 B1 6/2003 Yamazaki et al.
6,580,408 B1 6/2003 Bae et al.
6,580,657 B2 6/2003 Sanford et al.
6,583,398 B2 6/2003 Harkin
6,583,775 B1 6/2003 Sekiya et al.
6,583,776 B2 6/2003 Yamazaki et al.
6,587,086 B1 7/2003 Koyama
6,593,691 B2 7/2003 Nishi et al.
6,594,606 B2 7/2003 Everitt
6,597,203 B2 7/2003 Forbes
6,611,108 B2 8/2003 Kimura
6,617,644 B1 9/2003 Yamazaki et al.
6,618,030 B2 9/2003 Kane et al.
6,639,244 B1 10/2003 Yamazaki et al.
6,641,933 B1 11/2003 Yamazaki et al.
6,661,180 B2 12/2003 Koyama
6,661,397 B2 12/2003 Mikami et al.
6,668,645 B1 12/2003 Gilmour et al.
6,670,637 B2 12/2003 Yamazaki et al.
6,677,713 B1 1/2004 Sung
6,680,577 B1 1/2004 Inukai et al.
6,680,580 B1 1/2004 Sung
6,687,266 B1 2/2004 Ma et al.
6,690,000 B1 2/2004 Muramatsu et al.
6,690,344 B1 2/2004 Takeuchi et al.
6,693,388 B2 2/2004 Oomura
6,693,610 B2 2/2004 Shannon et al.
6,697,057 B2 2/2004 Koyama et al.
6,720,942 B2 4/2004 Lee et al.
6,724,151 B2 4/2004 Yoo
6,734,636 B2 5/2004 Sanford et al.
6,738,034 B2 5/2004 Kaneko et al.
6,738,035 B1 5/2004 Fan
6,753,655 B2 6/2004 Shih et al.
6,753,834 B2 6/2004 Mikami et al.
6,756,741 B2 6/2004 Li
6,756,952 B1 6/2004 Decaux et al.
6,756,958 B2 6/2004 Furuhashi et al.
6,771,028 B1 8/2004 Winters
6,777,712 B2 8/2004 Sanford et al.
6,777,888 B2 8/2004 Kondo
6,780,687 B2 8/2004 Nakajima et al.
6,781,567 B2 8/2004 Kimura
6,806,497 B2 10/2004 Jo
6,806,638 B2 10/2004 Lih et al.
6,806,857 B2 10/2004 Sempel et al.
6,809,706 B2 10/2004 Shimoda
6,815,975 B2 11/2004 Nara et al.
6,828,950 B2 12/2004 Koyama
6,853,371 B2 2/2005 Miyajima et al.

(56) References Cited

U.S. PATENT DOCUMENTS

| | | | |
|---|---|---|---|
| 6,859,193 | B1 | 2/2005 | Yumoto |
| 6,861,670 | B1 | 3/2005 | Ohtani et al. |
| 6,873,117 | B2 | 3/2005 | Ishizuka |
| 6,873,320 | B2 | 3/2005 | Nakamura |
| 6,876,346 | B2 | 4/2005 | Anzai et al. |
| 6,878,968 | B1 | 4/2005 | Ohnuma |
| 6,885,356 | B2 | 4/2005 | Hashimoto |
| 6,900,485 | B2 | 5/2005 | Lee |
| 6,903,734 | B2 | 6/2005 | Eu |
| 6,909,114 | B1 | 6/2005 | Yamazaki |
| 6,909,243 | B2 | 6/2005 | Inukai |
| 6,909,419 | B2 | 6/2005 | Zavracky et al. |
| 6,911,960 | B1 | 6/2005 | Yokoyama |
| 6,911,964 | B2 | 6/2005 | Lee et al. |
| 6,914,448 | B2 | 7/2005 | Jinno |
| 6,919,871 | B2 | 7/2005 | Kwon |
| 6,924,602 | B2 | 8/2005 | Komiya |
| 6,937,215 | B2 | 8/2005 | Lo |
| 6,937,220 | B2 | 8/2005 | Kitaura et al. |
| 6,940,214 | B1 | 9/2005 | Komiya et al. |
| 6,943,500 | B2 | 9/2005 | LeChevalier |
| 6,947,022 | B2 | 9/2005 | McCartney |
| 6,954,194 | B2 | 10/2005 | Matsumoto et al. |
| 6,956,547 | B2 | 10/2005 | Bae et al. |
| 6,975,142 | B2 | 12/2005 | Azami et al. |
| 6,975,332 | B2 | 12/2005 | Arnold et al. |
| 6,995,510 | B2 | 2/2006 | Murakami et al. |
| 6,995,519 | B2 | 2/2006 | Arnold et al. |
| 7,022,556 | B1 | 4/2006 | Adachi |
| 7,023,408 | B2 | 4/2006 | Chen et al. |
| 7,027,015 | B2 | 4/2006 | Booth, Jr. et al. |
| 7,027,078 | B2 | 4/2006 | Reihl |
| 7,034,793 | B2 | 4/2006 | Sekiya et al. |
| 7,038,392 | B2 | 5/2006 | Libsch et al. |
| 7,057,359 | B2 | 6/2006 | Hung et al. |
| 7,061,451 | B2 | 6/2006 | Kimura |
| 7,064,733 | B2 | 6/2006 | Cok et al. |
| 7,071,932 | B2 | 7/2006 | Libsch et al. |
| 7,088,051 | B1 | 8/2006 | Cok |
| 7,088,052 | B2 | 8/2006 | Kimura |
| 7,102,378 | B2 | 9/2006 | Kuo et al. |
| 7,106,285 | B2 | 9/2006 | Naugler |
| 7,112,820 | B2 | 9/2006 | Change et al. |
| 7,116,058 | B2 | 10/2006 | Lo et al. |
| 7,119,493 | B2 | 10/2006 | Fryer et al. |
| 7,122,835 | B1 | 10/2006 | Ikeda et al. |
| 7,127,380 | B1 | 10/2006 | Iverson et al. |
| 7,129,914 | B2 | 10/2006 | Knapp et al. |
| 7,129,917 | B2 | 10/2006 | Yamazaki et al. |
| 7,141,821 | B1 | 11/2006 | Yamazaki et al. |
| 7,164,417 | B2 | 1/2007 | Cok |
| 7,193,589 | B2 | 3/2007 | Yoshida et al. |
| 7,199,516 | B2 | 4/2007 | Seo et al. |
| 7,220,997 | B2 | 5/2007 | Nakata |
| 7,224,332 | B2 | 5/2007 | Cok |
| 7,227,519 | B1 | 6/2007 | Kawase et al. |
| 7,235,810 | B1 | 6/2007 | Yamazaki et al. |
| 7,245,277 | B2 | 7/2007 | Ishizuka |
| 7,248,236 | B2 | 7/2007 | Nathan et al. |
| 7,262,753 | B2 | 8/2007 | Tanghe et al. |
| 7,264,979 | B2 | 9/2007 | Yamagata et al. |
| 7,274,345 | B2 | 9/2007 | Imamura et al. |
| 7,274,363 | B2 | 9/2007 | Ishizuka et al. |
| 7,279,711 | B1 | 10/2007 | Yamazaki et al. |
| 7,304,621 | B2 | 12/2007 | Oomori et al. |
| 7,310,092 | B2 | 12/2007 | Imamura |
| 7,315,295 | B2 | 1/2008 | Kimura |
| 7,319,465 | B2 | 1/2008 | Mikami et al. |
| 7,321,348 | B2 | 1/2008 | Cok et al. |
| 7,339,560 | B2 | 3/2008 | Sun |
| 7,339,636 | B2 | 3/2008 | Voloschenko et al. |
| 7,355,574 | B1 | 4/2008 | Leon et al. |
| 7,358,941 | B2 | 4/2008 | Ono et al. |
| 7,368,868 | B2 | 5/2008 | Sakamoto |
| 7,402,467 | B1 | 7/2008 | Kadono et al. |
| 7,411,571 | B2 | 8/2008 | Huh |
| 7,414,600 | B2 | 8/2008 | Nathan et al. |
| 7,423,617 | B2 | 9/2008 | Giraldo et al. |
| 7,432,885 | B2 | 10/2008 | Asano et al. |
| 7,474,285 | B2 | 1/2009 | Kimura |
| 7,485,478 | B2 | 2/2009 | Yamagata et al. |
| 7,502,000 | B2 | 3/2009 | Yuki et al. |
| 7,528,812 | B2 | 5/2009 | Tsuge et al. |
| 7,535,449 | B2 | 5/2009 | Miyazawa |
| 7,554,512 | B2 | 6/2009 | Steer |
| 7,569,849 | B2 | 8/2009 | Nathan et al. |
| 7,576,718 | B2 | 8/2009 | Miyazawa |
| 7,580,012 | B2 | 8/2009 | Kim et al. |
| 7,589,707 | B2 | 9/2009 | Chou |
| 7,609,239 | B2 | 10/2009 | Chang |
| 7,619,594 | B2 | 11/2009 | Hu |
| 7,619,597 | B2 | 11/2009 | Nathan et al. |
| 7,633,470 | B2 | 12/2009 | Kane |
| 7,656,370 | B2 | 2/2010 | Schneider et al. |
| 7,697,052 | B1 | 4/2010 | Yamazaki et al. |
| 7,800,558 | B2 | 9/2010 | Routley et al. |
| 7,825,419 | B2 | 11/2010 | Yamagata et al. |
| 7,847,764 | B2 | 12/2010 | Cok et al. |
| 7,859,492 | B2 | 12/2010 | Kohno |
| 7,868,859 | B2 | 1/2011 | Tomida et al. |
| 7,876,294 | B2 | 1/2011 | Sasaki et al. |
| 7,924,249 | B2 | 4/2011 | Nathan et al. |
| 7,932,883 | B2 | 4/2011 | Klompenhouwer et al. |
| 7,948,170 | B2 | 5/2011 | Striakhilev et al. |
| 7,969,390 | B2 | 6/2011 | Yoshida |
| 7,978,187 | B2 | 7/2011 | Nathan et al. |
| 7,994,712 | B2 | 8/2011 | Sung et al. |
| 7,995,010 | B2 | 8/2011 | Yamazaki et al. |
| 8,026,876 | B2 | 9/2011 | Nathan et al. |
| 8,044,893 | B2 | 10/2011 | Nathan et al. |
| 8,049,420 | B2 | 11/2011 | Tamura et al. |
| 8,077,123 | B2 | 12/2011 | Naugler, Jr. |
| 8,115,707 | B2 | 2/2012 | Nathan et al. |
| 8,223,177 | B2 | 7/2012 | Nathan et al. |
| 8,232,939 | B2 | 7/2012 | Nathan et al. |
| 8,259,044 | B2 | 9/2012 | Nathan et al. |
| 8,264,431 | B2 | 9/2012 | Bulovic et al. |
| 8,279,143 | B2 | 10/2012 | Nathan et al. |
| 8,339,386 | B2 | 12/2012 | Leon et al. |
| 8,493,295 | B2 | 7/2013 | Yamazaki et al. |
| 8,497,525 | B2 | 7/2013 | Yamagata et al. |
| 2001/0002703 | A1 | 6/2001 | Koyama |
| 2001/0004190 | A1 | 6/2001 | Nishi et al. |
| 2001/0009283 | A1 | 7/2001 | Arao et al. |
| 2001/0020926 | A1 | 9/2001 | Kuijk |
| 2001/0024181 | A1 | 9/2001 | Kubota |
| 2001/0024186 | A1 | 9/2001 | Kane et al. |
| 2001/0026127 | A1 | 10/2001 | Yoneda et al. |
| 2001/0026179 | A1 | 10/2001 | Saeki |
| 2001/0026257 | A1 | 10/2001 | Kimura |
| 2001/0030323 | A1 | 10/2001 | Ikeda |
| 2001/0038098 | A1 | 11/2001 | Yamazaki et al. |
| 2001/0040541 | A1 | 11/2001 | Yoneda et al. |
| 2001/0043173 | A1 | 11/2001 | Troutman |
| 2001/0045929 | A1 | 11/2001 | Prache |
| 2001/0052606 | A1 | 12/2001 | Sempel et al. |
| 2001/0052898 | A1 | 12/2001 | Osame et al. |
| 2001/0052940 | A1 | 12/2001 | Hagihara et al. |
| 2002/0000576 | A1 | 1/2002 | Inukai |
| 2002/0011796 | A1 | 1/2002 | Koyama |
| 2002/0011799 | A1 | 1/2002 | Kimura |
| 2002/0011981 | A1 | 1/2002 | Kujik |
| 2002/0012057 | A1 | 1/2002 | Kimura |
| 2002/0014851 | A1 | 2/2002 | Tai et al. |
| 2002/0015031 | A1 | 2/2002 | Fujita et al. |
| 2002/0015032 | A1 | 2/2002 | Koyama et al. |
| 2002/0018034 | A1 | 2/2002 | Ohki et al. |
| 2002/0030190 | A1 | 3/2002 | Ohtani et al. |
| 2002/0030528 | A1 | 3/2002 | Matsumoto et al. |
| 2002/0030647 | A1 | 3/2002 | Hack et al. |
| 2002/0036463 | A1 | 3/2002 | Yoneda et al. |
| 2002/0047565 | A1 | 4/2002 | Nara et al. |
| 2002/0047852 | A1 | 4/2002 | Inukai et al. |
| 2002/0048829 | A1 | 4/2002 | Yamazaki et al. |

(56) References Cited

U.S. PATENT DOCUMENTS

2002/0050795 A1 5/2002 Imura
2002/0052086 A1 5/2002 Maeda
2002/0053401 A1 5/2002 Ishikawa et al.
2002/0067134 A1 6/2002 Kawashima
2002/0070909 A1 6/2002 Asano et al.
2002/0080108 A1 6/2002 Wang
2002/0084463 A1 7/2002 Sanford et al.
2002/0101172 A1 8/2002 Bu
2002/0101433 A1 8/2002 McKnight
2002/0105279 A1 8/2002 Kimura
2002/0113248 A1 8/2002 Yamagata et al.
2002/0117722 A1 8/2002 Osada et al.
2002/0122308 A1 9/2002 Ikeda
2002/0130686 A1 9/2002 Forbes
2002/0154084 A1 10/2002 Tanaka et al.
2002/0158587 A1 10/2002 Komiya
2002/0158666 A1 10/2002 Azami et al.
2002/0158823 A1 10/2002 Zavracky et al.
2002/0163314 A1 11/2002 Yamazaki et al.
2002/0167474 A1 11/2002 Everitt
2002/0180369 A1 12/2002 Koyama
2002/0180721 A1 12/2002 Kimura et al.
2002/0186214 A1 12/2002 Siwinski
2002/0190332 A1 12/2002 Lee et al.
2002/0190924 A1 12/2002 Asano et al.
2002/0190971 A1 12/2002 Nakamura et al.
2002/0195967 A1 12/2002 Kim et al.
2002/0195968 A1 12/2002 Sanford et al.
2003/0020413 A1 1/2003 Oomura
2003/0030603 A1 2/2003 Shimoda
2003/0043088 A1 3/2003 Booth et al.
2003/0057895 A1 3/2003 Kimura
2003/0058226 A1 3/2003 Bertram et al.
2003/0062524 A1 4/2003 Kimura
2003/0063081 A1 4/2003 Kimura et al.
2003/0071821 A1 4/2003 Sundahl et al.
2003/0076048 A1 4/2003 Rutherford
2003/0090445 A1 5/2003 Chen et al.
2003/0090447 A1 5/2003 Kimura
2003/0090481 A1 5/2003 Kimura
2003/0095087 A1 5/2003 Libsch
2003/0107560 A1 6/2003 Yumoto et al.
2003/0111966 A1 6/2003 Mikami et al.
2003/0122745 A1 7/2003 Miyazawa
2003/0122813 A1 7/2003 Ishizuki et al.
2003/0140958 A1 7/2003 Yang et al.
2003/0142088 A1 7/2003 LeChevalier
2003/0151569 A1 8/2003 Lee et al.
2003/0156101 A1 8/2003 Le Chevalier
2003/0169219 A1 9/2003 LeChevalier
2003/0174152 A1 9/2003 Noguchi
2003/0179626 A1 9/2003 Sanford et al.
2003/0197663 A1 10/2003 Lee et al.
2003/0210256 A1 11/2003 Mori et al.
2003/0230141 A1 12/2003 Gilmour et al.
2003/0230980 A1 12/2003 Forrest et al.
2003/0231148 A1 12/2003 Lin et al.
2004/0027063 A1 2/2004 Nishikawa
2004/0032382 A1 2/2004 Cok et al.
2004/0056604 A1 3/2004 Shih et al.
2004/0066357 A1 4/2004 Kawasaki
2004/0070557 A1 4/2004 Asano et al.
2004/0070565 A1 4/2004 Nayar et al.
2004/0080262 A1 4/2004 Park et al.
2004/0080470 A1 4/2004 Yamazaki et al.
2004/0090400 A1 5/2004 Yoo
2004/0095297 A1 5/2004 Libsch et al.
2004/0100427 A1 5/2004 Miyazawa
2004/0108518 A1 6/2004 Jo
2004/0113903 A1 6/2004 Mikami et al.
2004/0129933 A1 7/2004 Nathan et al.
2004/0130516 A1 7/2004 Nathan et al.
2004/0135749 A1 7/2004 Kondakov et al.
2004/0145547 A1 7/2004 Oh
2004/0150592 A1 8/2004 Mizukoshi et al.
2004/0150594 A1 8/2004 Koyama et al.
2004/0150595 A1 8/2004 Kasai
2004/0155841 A1 8/2004 Kasai
2004/0174347 A1 9/2004 Sun et al.
2004/0174349 A1 9/2004 Libsch
2004/0174354 A1 9/2004 Ono et al.
2004/0178743 A1 9/2004 Miller et al.
2004/0183759 A1 9/2004 Stevenson et al.
2004/0189627 A1 9/2004 Shirasaki et al.
2004/0196275 A1 10/2004 Hattori
2004/0201554 A1 10/2004 Satoh
2004/0207615 A1 10/2004 Yumoto
2004/0239596 A1 12/2004 Ono et al.
2004/0252089 A1 12/2004 Ono et al.
2004/0257313 A1 12/2004 Kawashima et al.
2004/0257353 A1 12/2004 Imamura et al.
2004/0257355 A1 12/2004 Naugler
2004/0263437 A1 12/2004 Hattori
2004/0263444 A1 12/2004 Kimura
2004/0263445 A1 12/2004 Inukai et al.
2004/0263541 A1 12/2004 Takeuchi et al.
2005/0007355 A1 1/2005 Miura
2005/0007357 A1 1/2005 Yamashita et al.
2005/0017650 A1 1/2005 Fryer et al.
2005/0024081 A1 2/2005 Kuo et al.
2005/0024393 A1 2/2005 Kondo et al.
2005/0030267 A1 2/2005 Tanghe et al.
2005/0035709 A1 2/2005 Furuie et al.
2005/0057580 A1 3/2005 Yamano et al.
2005/0067970 A1 3/2005 Libsch et al.
2005/0067971 A1 3/2005 Kane
2005/0068270 A1 3/2005 Awakura
2005/0068275 A1 3/2005 Kane
2005/0073264 A1 4/2005 Matsumoto
2005/0083323 A1 4/2005 Suzuki et al.
2005/0088103 A1 4/2005 Kageyama et al.
2005/0110420 A1 5/2005 Arnold et al.
2005/0110807 A1 5/2005 Chang
2005/0117096 A1 6/2005 Voloschenko et al.
2005/0140598 A1 6/2005 Kim et al.
2005/0140610 A1 6/2005 Smith et al.
2005/0145891 A1 7/2005 Abe
2005/0156831 A1 7/2005 Yamazaki et al.
2005/0168416 A1 8/2005 Hashimoto et al.
2005/0179626 A1 8/2005 Yuki et al.
2005/0179628 A1 8/2005 Kimura
2005/0185200 A1 8/2005 Tobol
2005/0200575 A1 9/2005 Kim et al.
2005/0206590 A1 9/2005 Sasaki et al.
2005/0219184 A1 10/2005 Zehner et al.
2005/0225686 A1 10/2005 Brummack et al.
2005/0248515 A1 11/2005 Naugler et al.
2005/0260777 A1 11/2005 Brabec et al.
2005/0269959 A1 12/2005 Uchino et al.
2005/0269960 A1 12/2005 Ono et al.
2005/0280615 A1 12/2005 Cok et al.
2005/0280766 A1 12/2005 Johnson et al.
2005/0285822 A1 12/2005 Reddy et al.
2005/0285825 A1 12/2005 Eom et al.
2006/0001613 A1 1/2006 Routley et al.
2006/0007072 A1 1/2006 Choi et al.
2006/0012310 A1 1/2006 Chen et al.
2006/0012311 A1 1/2006 Ogawa
2006/0027807 A1 2/2006 Nathan et al.
2006/0030084 A1 2/2006 Young
2006/0038758 A1 2/2006 Routley et al.
2006/0038762 A1 2/2006 Chou
2006/0066527 A1 3/2006 Chou
2006/0066533 A1 3/2006 Sato et al.
2006/0077135 A1 4/2006 Cok et al.
2006/0082523 A1 4/2006 Guo et al.
2006/0092185 A1 5/2006 Jo et al.
2006/0097628 A1 5/2006 Suh et al.
2006/0097631 A1 5/2006 Lee
2006/0103611 A1 5/2006 Choi
2006/0149493 A1 7/2006 Sambandan et al.
2006/0170623 A1 8/2006 Naugler, Jr. et al.
2006/0176250 A1 8/2006 Nathan et al.
2006/0208961 A1 9/2006 Nathan et al.

(56) References Cited

U.S. PATENT DOCUMENTS

| | | | |
|---|---|---|---|
| 2006/0232522 | A1 | 10/2006 | Roy et al. |
| 2006/0244697 | A1 | 11/2006 | Lee et al. |
| 2006/0261841 | A1 | 11/2006 | Fish |
| 2006/0264143 | A1 | 11/2006 | Lee et al. |
| 2006/0273997 | A1 | 12/2006 | Nathan et al. |
| 2006/0284801 | A1 | 12/2006 | Yoon et al. |
| 2006/0284895 | A1 | 12/2006 | Marcu et al. |
| 2006/0290618 | A1 | 12/2006 | Goto |
| 2007/0001937 | A1 | 1/2007 | Park et al. |
| 2007/0001939 | A1 | 1/2007 | Hashimoto et al. |
| 2007/0008268 | A1 | 1/2007 | Park et al. |
| 2007/0008297 | A1 | 1/2007 | Bassetti |
| 2007/0057873 | A1 | 3/2007 | Uchino et al. |
| 2007/0069998 | A1 | 3/2007 | Naugler et al. |
| 2007/0075727 | A1 | 4/2007 | Nakano et al. |
| 2007/0076226 | A1 | 4/2007 | Klompenhouwer et al. |
| 2007/0080905 | A1 | 4/2007 | Takahara |
| 2007/0080906 | A1 | 4/2007 | Tanabe |
| 2007/0080908 | A1 | 4/2007 | Nathan et al. |
| 2007/0080918 | A1 | 4/2007 | Kawachi et al. |
| 2007/0097038 | A1 | 5/2007 | Yamazaki et al. |
| 2007/0097041 | A1 | 5/2007 | Park et al. |
| 2007/0103419 | A1 | 5/2007 | Uchino et al. |
| 2007/0115221 | A1 | 5/2007 | Buchhauser et al. |
| 2007/0182671 | A1 | 8/2007 | Nathan et al. |
| 2007/0236517 | A1 | 10/2007 | Kimpe |
| 2007/0241999 | A1 | 10/2007 | Lin |
| 2007/0273294 | A1 | 11/2007 | Nagayama |
| 2007/0285359 | A1 | 12/2007 | Ono |
| 2007/0290958 | A1 | 12/2007 | Cok |
| 2007/0296672 | A1 | 12/2007 | Kim et al. |
| 2008/0001525 | A1 | 1/2008 | Chao et al. |
| 2008/0001544 | A1 | 1/2008 | Murakami et al. |
| 2008/0036708 | A1 | 2/2008 | Shirasaki |
| 2008/0042942 | A1 | 2/2008 | Takahashi |
| 2008/0042948 | A1 | 2/2008 | Yamashita et al. |
| 2008/0048951 | A1 | 2/2008 | Naugler, Jr. et al. |
| 2008/0055209 | A1 | 3/2008 | Cok |
| 2008/0074413 | A1 | 3/2008 | Ogura |
| 2008/0088549 | A1 | 4/2008 | Nathan et al. |
| 2008/0088648 | A1 | 4/2008 | Nathan et al. |
| 2008/0117144 | A1 | 5/2008 | Nakano et al. |
| 2008/0150847 | A1 | 6/2008 | Kim et al. |
| 2008/0231558 | A1 | 9/2008 | Naugler |
| 2008/0231562 | A1 | 9/2008 | Kwon |
| 2008/0252571 | A1 | 10/2008 | Hente et al. |
| 2008/0290805 | A1 | 11/2008 | Yamada et al. |
| 2008/0297055 | A1 | 12/2008 | Miyake et al. |
| 2009/0032807 | A1 | 2/2009 | Shinohara et al. |
| 2009/0058772 | A1 | 3/2009 | Lee |
| 2009/0160743 | A1 | 6/2009 | Tomida et al. |
| 2009/0174628 | A1 | 7/2009 | Wang et al. |
| 2009/0184901 | A1 | 7/2009 | Kwon |
| 2009/0195483 | A1 | 8/2009 | Naugler, Jr. et al. |
| 2009/0201281 | A1 | 8/2009 | Routley et al. |
| 2009/0213046 | A1 | 8/2009 | Nam |
| 2010/0004891 | A1 | 1/2010 | Ahlers et al. |
| 2010/0026725 | A1 | 2/2010 | Smith |
| 2010/0060911 | A1 | 3/2010 | Marcu et al. |
| 2010/0079711 | A1 | 4/2010 | Tanaka |
| 2010/0165002 | A1 | 7/2010 | Ahn |
| 2010/0194670 | A1 | 8/2010 | Cok |
| 2010/0207960 | A1 | 8/2010 | Kimpe et al. |
| 2010/0277400 | A1 | 11/2010 | Jeong |
| 2010/0315319 | A1 | 12/2010 | Cok et al. |
| 2010/0328294 | A1 | 12/2010 | Sasaki et al. |
| 2011/0069051 | A1 | 3/2011 | Nakamura et al. |
| 2011/0069089 | A1 | 3/2011 | Kopf et al. |
| 2011/0074750 | A1 | 3/2011 | Leon et al. |
| 2011/0090210 | A1 | 4/2011 | Sasaki et al. |
| 2011/0149166 | A1 | 6/2011 | Botzas et al. |
| 2011/0227964 | A1 | 9/2011 | Chaji et al. |
| 2011/0293480 | A1 | 12/2011 | Mueller |
| 2012/0056558 | A1 | 3/2012 | Toshiya et al. |
| 2012/0062565 | A1 | 3/2012 | Fuchs et al. |
| 2012/0299978 | A1 | 11/2012 | Chaji |
| 2013/0027381 | A1 | 1/2013 | Nathan et al. |
| 2013/0057595 | A1 | 3/2013 | Nathan et al. |

FOREIGN PATENT DOCUMENTS

| | | | |
|---|---|---|---|
| CA | 2 249 592 | | 7/1998 |
| CA | 2 368 386 | | 9/1999 |
| CA | 2 242 720 | | 1/2000 |
| CA | 2 354 018 | | 6/2000 |
| CA | 2 432 530 | | 7/2002 |
| CA | 2 436 451 | | 8/2002 |
| CA | 2 438 577 | | 8/2002 |
| CA | 2 483 645 | | 12/2003 |
| CA | 2 463 653 | | 1/2004 |
| CA | 2 498 136 | | 3/2004 |
| CA | 2 522 396 | | 11/2004 |
| CA | 2 443 206 | | 3/2005 |
| CA | 2 472 671 | | 12/2005 |
| CA | 2 567 076 | | 1/2006 |
| CA | 2 526 782 | | 4/2006 |
| CA | 2 550 102 | | 4/2008 |
| CN | 1381032 | | 11/2002 |
| CN | 1448908 | | 10/2003 |
| CN | 1760945 | | 4/2006 |
| DE | 20 2006 00542 | | 6/2006 |
| EP | 0 158 366 | | 10/1985 |
| EP | 0 940 796 | | 9/1999 |
| EP | 1 028 471 | | 8/2000 |
| EP | 1 103 947 | | 5/2001 |
| EP | 1 111 577 | | 6/2001 |
| EP | 1 130 565 | A1 | 9/2001 |
| EP | 1 184 833 | | 3/2002 |
| EP | 1 194 013 | | 4/2002 |
| EP | 1 310 939 | | 5/2003 |
| EP | 1 335 430 | A1 | 8/2003 |
| EP | 1 372 136 | | 12/2003 |
| EP | 1 381 019 | | 1/2004 |
| EP | 1 418 566 | | 5/2004 |
| EP | 1 429 312 | A | 6/2004 |
| EP | 1 439 520 | | 7/2004 |
| EP | 1 465 143 | A | 10/2004 |
| EP | 1 467 408 | | 10/2004 |
| EP | 1 469 448 | A | 10/2004 |
| EP | 1 517 290 | | 3/2005 |
| EP | 1 521 203 | A2 | 4/2005 |
| EP | 1 594 347 | | 11/2005 |
| EP | 1 784 055 | A2 | 5/2007 |
| EP | 1 879 169 | A1 | 1/2008 |
| EP | 1 879 172 | | 1/2008 |
| GB | 2 205 431 | | 12/1988 |
| GB | 2 389 951 | | 12/2003 |
| JP | 1 272 298 | | 10/1989 |
| JP | 4-042619 | | 2/1992 |
| JP | 6-314977 | | 11/1994 |
| JP | 8-340243 | | 12/1996 |
| JP | 09 090405 | | 4/1997 |
| JP | 10-153759 | | 6/1998 |
| JP | 10-254410 | | 9/1998 |
| JP | 11-202295 | | 7/1999 |
| JP | 11-219146 | | 8/1999 |
| JP | 11 231805 | | 8/1999 |
| JP | 11-282419 | | 10/1999 |
| JP | 2000-056847 | | 2/2000 |
| JP | 2000-077192 | | 3/2000 |
| JP | 2000-81607 | | 3/2000 |
| JP | 2000-089198 | | 3/2000 |
| JP | 2000-352941 | | 12/2000 |
| JP | 2001-134217 | | 5/2001 |
| JP | 2001-195014 | | 7/2001 |
| JP | 2002-055654 | | 2/2002 |
| JP | 2002-91376 | | 3/2002 |
| JP | 2002-514320 | | 5/2002 |
| JP | 2002-268576 | | 9/2002 |
| JP | 2002-278513 | | 9/2002 |
| JP | 2002-333862 | | 11/2002 |
| JP | 2003-022035 | | 1/2003 |
| JP | 2003-076331 | | 3/2003 |
| JP | 2003-124519 | | 4/2003 |

(56) References Cited

FOREIGN PATENT DOCUMENTS

| | | | |
|---|---|---|---|
| JP | 2003-150082 | | 5/2003 |
| JP | 2003-177709 | | 6/2003 |
| JP | 2003-271095 | | 9/2003 |
| JP | 2003-308046 | | 10/2003 |
| JP | 2003-317944 | | 11/2003 |
| JP | 2004-145197 | | 5/2004 |
| JP | 2004-287345 | | 10/2004 |
| JP | 2005-057217 | | 3/2005 |
| JP | 4-158570 | | 10/2008 |
| KR | 2004-0100887 | | 12/2004 |
| TW | 342486 | | 10/1998 |
| TW | 473622 | | 1/2002 |
| TW | 485337 | | 5/2002 |
| TW | 502233 | | 9/2002 |
| TW | 538650 | | 6/2003 |
| TW | 569173 | | 1/2004 |
| TW | 1221268 | | 9/2004 |
| TW | 200727247 | | 7/2007 |
| WO | WO 94/25954 | | 11/1994 |
| WO | WO 98/48403 | | 10/1998 |
| WO | WO 99/48079 | | 9/1999 |
| WO | WO 01/06484 | | 1/2001 |
| WO | WO 01/27910 | A1 | 4/2001 |
| WO | WO 01/63587 | A2 | 8/2001 |
| WO | WO 02/067327 | A | 8/2002 |
| WO | WO 03/001496 | A1 | 1/2003 |
| WO | WO 03/034389 | A | 4/2003 |
| WO | WO 03/058594 | A1 | 7/2003 |
| WO | WO 03/063124 | | 7/2003 |
| WO | WO 03/077231 | | 9/2003 |
| WO | WO 03/105117 | | 12/2003 |
| WO | WO 2004/003877 | | 1/2004 |
| WO | WO 2004/025615 | A | 3/2004 |
| WO | WO 2004/034364 | | 4/2004 |
| WO | WO 2004/047058 | | 6/2004 |
| WO | WO 2004/104975 | A1 | 12/2004 |
| WO | WO 2005/022498 | | 3/2005 |
| WO | WO 2005/022500 | A | 3/2005 |
| WO | WO 2005/029455 | | 3/2005 |
| WO | WO 2005/029456 | | 3/2005 |
| WO | WO 2005/055185 | | 6/2005 |
| WO | WO 2006/000101 | A1 | 1/2006 |
| WO | WO 2006/053424 | | 5/2006 |
| WO | WO 2006/063448 | A | 6/2006 |
| WO | WO 2006/084360 | | 8/2006 |
| WO | WO 2006/137337 | | 12/2006 |
| WO | WO 2007/003877 | A | 1/2007 |
| WO | WO 2007/079572 | | 7/2007 |
| WO | WO 2007/120849 | A2 | 10/2007 |
| WO | WO 2009/055920 | | 5/2009 |
| WO | WO 2010/023270 | | 3/2010 |
| WO | WO 2011/041224 | A1 | 4/2011 |

OTHER PUBLICATIONS

Alexander et al.: "Pixel circuits and drive schemes for glass and elastic AMOLED displays"; dated Jul. 2005 (9 pages).
Alexander et al.: "Unique Electrical Measurement Technology for Compensation, Inspection, and Process Diagnostics of AMOLED HDTV"; dated May 2010 (4 pages).
Ashtiani et al.: "AMOLED Pixel Circuit With Electronic Compensation of Luminance Degradation"; dated Mar. 2007 (4 pages).
Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T- and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-μA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report and Written Opinion for Application No. 08 86 5338 mailed Nov. 2, 2011 (7 pages).
European Search Report for EP Application No. EP 10 16 6143, dated Sep. 3, 2010 (2 pages).
European Search Report for European Application No. 11739485.8-1904 dated Aug. 6, 2013, (14 pages).
European Search Report for European Application No. EP 011 12 2313 dated Sep. 14, 2005 (4 pages).
European Search Report for European Application No. EP 04 78 6661 dated Mar. 9, 2009.
European Search Report for European Application No. EP 05 75 9141 dated Oct. 30, 2009 (2 pages).
European Search Report for European Application No. EP 05 81 9617 dated Jan. 30, 2009.
European Search Report for European Application No. EP 05 82 1114 dated Mar. 27, 2009 (2 pages).
European Search Report for European Application No. EP 06 70 5133 dated Jul. 18, 2008.

(56) References Cited

OTHER PUBLICATIONS

European Search Report for European Application No. EP 06 72 1798 dated Nov. 12, 2009 (2 pages).
European Search Report for European Application No. EP 07 71 9579 dated May 20, 2009.
European Search Report for European Application No. EP 07 81 5784 dated Jul. 20, 2010 (2 pages).
European Search Report for European Application No. EP 07710608.6 dated Mar. 19, 2010 (7 pages).
European Search Report mailed Mar. 26, 2012 in corresponding European Patent Application No. 10000421.7 (6 pages).
European Search Report, Application No. 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. 09733076.5 (13 pages).
Extended European Search Report mailed Aug. 6, 2013, issued in European Patent Application No. 11739485.8 (14 page).
Extended European Search Report mailed Jul. 11, 2012 which issued in corresponding European Patent Application No. 11191641.7 (14 pages).
Extended European Search Report mailed Nov. 29, 2012, issued in European Patent Application No. 11168677.0 (13 page).
Fossum, Eric R.. "Active Pixel Sensors: Are CCD's Dinosaurs?" SPIE: Symposium on Electronic Imaging. Feb. 1, 1993 (13 pages).
Goh et al., "A New a-Si:H Thin Film Transistor Pixel Circul for Active-Matrix Organic Light-Emitting Diodes", IEEE Electron Device Letters, vol. 24, No. 9, Sep. 2003, 4 pages.
International Preliminary Report on Patentability for International Application No. PCT/CA2005/001007 dated Oct. 16, 2006, 4 pages.
International Search Report corresponding to co-pending International Patent Application Serial No. PCT/IB2013/054251, Canadian Intellectual Property Office, dated Sep. 11, 2013; (4 pages).
International Search Report corresponding to International Application No. PCTIB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA02/00180 dated Jul. 31, 2002 (3 pages).
International Search Report for International Application No. PCT/CA2005/001844 dated Mar. 28, 2006 (2 pages).
International Search Report for International Application No. PCT/CA2008/002307, mailed Apr. 28, 2009 (3 pages).
International Search Report for International Application No. PCT/IB2011/055135, Canadian Patent Office, dated Apr. 16, 2012 (5 pages).
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2006/000177 dated Jun. 2, 2006.
International Search Report for International Application No. PCT/CA2004/001741 dated Feb. 21, 2005 .
International Search Report for PCT Application No. PCT/CA2009/001769, dated Apr. 8, 2010 (3 pages).
International Search Report mailed Dec. 3, 2002, issued in International Patent Application No. PCT/JP02/09668 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2011/051103, dated Jul. 8, 2011, 3 pages.
International Searching Authority Written Opinion, PCT/IB2010/055481, dated Apr. 7, 2011, 6 pages.
International Searching Authority Written Opinion, PCT/IB2011/051103, dated Jul. 8, 2011, 6 pages.
International Search Report mailed Jul. 30, 2009 for International Application No. PCT/CA2009/000501. (4 pages).
International Written Opinion corresponding to co-pending International Patent Application Serial No. PCT/IB2013/054251, Canadian Intellectual Property Office, dated Sep. 11, 2013; (5 pages).
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
Jafarabadiashtiani et al.: "A New Driving Method for a-Si AMOLED Displays Based on Voltage Feedback"; dated 2005 (4 pages).
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee et al.: "Ambipolar Thin-Film Transistors Fabricated by PECVD Nanocrystalline Silicon"; dated 2006 (6 pages).
Lee, Wonbok: "Thermal Management in Microprocessor Chips and Dynamic Backlight Control in Liquid Crystal Displays", Ph.D. Dissertation, University of Southern California (124 pages).
Ma e y et al: "Organic Light-Emitting Diode/Thin Film Transistor Integration for foldable Displays" Conference record of the 1997 International display research conference and international workshops on LCD technology and emissive technology. Toronto, Sep. 15-19, 1997 (6 pages).
Machine English translation of JP 2002-333862, 49 pages.
Matsueda y et al.: "35.1: 2.5-in. AMOELD with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOELD displays"; dated Dec. 2005 (11 pages).
Nathan et al.: "Invited Paper: a -Si for AMOLED—Meeting the Performance and Cost Demands of Display Applications (Cell Phone to HDTV)"; dated 2006 (4 pages).
Nathan et al.: "Thin film imaging technology on glass and plastic" ICM 2000, Proceedings of the $12^{th}$ International Conference on

(56) References Cited

OTHER PUBLICATIONS

Microelectronics, (IEEE Cat. No. 00EX453), Tehran Iran; dated Oct. 31-Nov. 2, 2000, pp. 11-14, ISBN: 964-360-057-2, p. 13, col. 1, line 11-48; (4 pages).
Office Action in Japanese patent application No. 2006-527247 dated Mar. 15, 2010. (8 pages).
Office Action in Japanese patent application No. 2007-545796 dated Sep. 5, 2011. (8 pages).
Office Action issued in Chinese Patent Application 2009-10246264.4 Dated Jul. 5, 2013; 8 pages.
Partial European Search Report mailed Mar. 20, 2012 which issued in corresponding European Patent Application No. 11191641.7 (8 pages).
Partial European Search Report mailed Sep. 22, 2011 corresponding to European Patent Application No. 11168677.0 (5 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Sanford, James L., et al., "4.2 TFT AMOLED Pixel Circuits and Driving Methods", SID 03 Digest, ISSN/0003, 2003, pp. 10-13.
Search Report for Taiwan Invention Patent Application No. 093128894 dated May 1, 2012. (1 page).
Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Tatsuya Sasaoka et al., 24.4L; Late-News Paper: A 13.0-inch AM-Oled Display with Top Emitting Structure and Adaptive Current Mode Programmed Pixel Circuit (TAC), SID 01 Digest, (2001), pp. 384-387.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Zhiguo Meng et al; "24.3: Active-Matrix Organic Light-Emitting Diode Display implemented Using Metal-Induced Unilaterally Crystallized Polycrystalline Silicon Thin-Film Transistors", SID 01Digest, (2001), pp. 380-383.

1000

STABLE DRIVING SCHEME FOR ACTIVE MATRIX DISPLAYS

CROSS REFERENCE TO RELATED APPLICATIONS

This application is a continuation of U.S. patent application Ser. No. 11/736,751, filed Apr. 18, 2007, now allowed, which claims priority to Canadian Patent Application No. 2,544,090, filed Apr. 19, 2006; the entire contents of which are incorporated herein by reference.

FIELD OF INVENTION

The present invention relates to light emitting device displays, and more specifically to a method and system for driving a pixel circuit.

BACKGROUND OF THE INVENTION

Electro-luminance displays have been developed for a wide variety of devices, such as cell phones. In particular, active-matrix organic light emitting diode (AMOLED) displays with amorphous silicon (a-Si), poly-silicon, organic, or other driving backplane have become more attractive due to advantages, such as feasible flexible displays, its low cost fabrication, high resolution, and a wide viewing angle.

An AMOLED display includes an array of rows and columns of pixels, each having an organic light emitting diode (OLED) and backplane electronics arranged in the array of rows and columns. Since the OLED is a current driven device, the pixel circuit of the AMOLED should be capable of providing an accurate and constant drive current.

However, the AMOLED displays exhibit non-uniformities in luminance on a pixel-to-pixel basis, as a result of pixel degradation, i.e., aging caused by operational use over time (e.g., threshold shift, OLED aging). Depending on the usage of the display, different pixels may have different amounts of the degradation. There may be an ever-increasing error between the required brightness of some pixels as specified by luminance data and the actual brightness of the pixels. The result is that the desired image will not show properly on the display.

Therefore, there is a need to provide a method and system that is capable of suppressing the aging of the pixel circuit.

SUMMARY OF THE INVENTION

It is an object of the invention to provide a method and system that obviates or mitigates at least one of the disadvantages of existing systems.

In accordance with an aspect of the present invention there is provided a method of operating a pixel array having at least one pixel circuit. The method includes the steps of: repeating an operation cycle defining a frame period for a pixel circuit, including at each frame period, programming the pixel circuit, driving the pixel circuit; and relaxing a stress effect on the pixel circuit, prior to a next frame period.

In accordance with another aspect of the present invention there is provided a display system. The display system includes a pixel array including a plurality of pixel circuits and a plurality of lines for operation of the plurality of pixel circuits. Each of the pixel circuits includes a light emitting device, a storage capacitor, and a drive circuit connected to the light emitting device and the storage capacitor. The display system includes a drive for operating the plurality of lines to repeat an operation cycle having a frame period so that each of the operation cycle comprises a programming cycle, a driving cycle and a relaxing cycle for relaxing a stress on a pixel circuit, prior to a next frame period.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 10(*b*) is a diagram illustrating an example of array structure having bottom emission pixels applicable to the display system of FIG. 4.

DETAILED DESCRIPTION OF THE PREFERRED EMBODIMENTS

Embodiments of the present invention are described using a pixel circuit having an organic light emitting diode (OLED) and a plurality of thin film transistors (TFTs). The pixel circuit may contain a light emitting device other than the OLED. The transistors in the pixel circuit may be n-type transistors, p-type transistors or combinations thereof. The transistors in the pixel circuit may be fabricated using amorphous silicon, nano/micro crystalline silicon, poly silicon, organic semiconductors technologies (e.g., organic TFT), NMOS/PMOS technology, CMOS technology (e.g., MOSFET) or combinations thereof. A display having the pixel circuit may be a single color, multi-color or a fully color display, and may include one or more than one electroluminescence (EL) element (e.g., organic EL). The display may be an active matrix light emitting display (e.g., AMOLED). The display may be used in DVDs, personal digital assistants (PDAs), computer displays, or cellular phones. The display may be a flat panel.

In the description below, "pixel circuit" and "pixel" are used interchangeably. In the description below, "signal" and "line" may be used interchangeably. In the description below, the terms "line" and "node" may be used interchangeably. In the description below, the terms "select line" and "address line" may be used interchangeably. In the description below, "connect (or connected)" and "couple (or coupled)" may be used interchangeably, and may be used to indicate that two or more elements are directly or indirectly in physical or electrical contact with each other.

Figure 1:
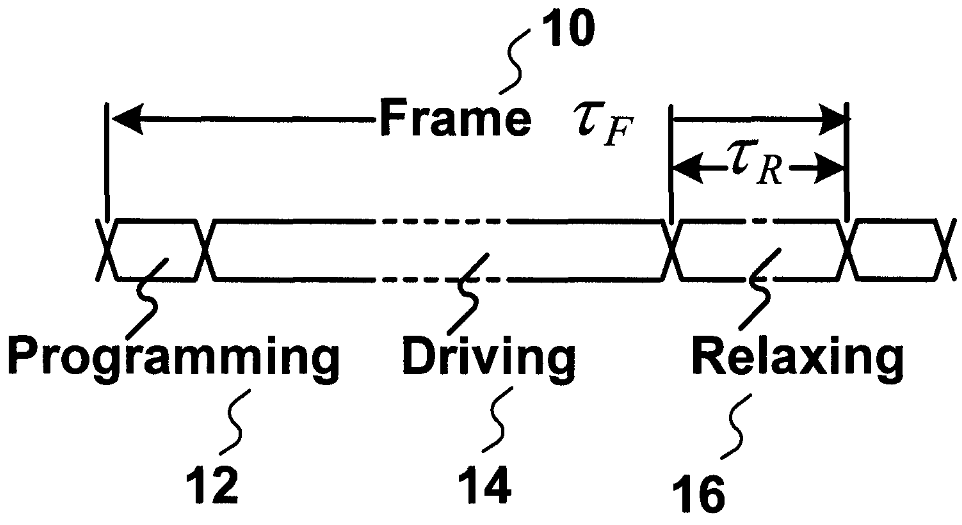
FIG. 1 is a timing chart for suppressing aging of a pixel circuit, in accordance with an embodiment of the present invention

FIG. 1 illustrates a timing schedule for suppressing aging for a pixel circuit, in accordance with an embodiment of the present invention. The pixel circuit, which is operated using the timing schedule of FIG. 1, includes a plurality of transistors and an OLED (e.g., 22, 24, 26 of FIG. 2). In FIG. 1, a frame 10 is divided into three phases: a programming cycle 12, a driving (i.e., emitting) cycle 14, and a relaxing cycle 16. The frame 10 is a time interval or period in which a display shows a frame of a video signal. During the programming cycle 12, a pixel circuit is programmed with required data to provide the wanted brightness. During the driving cycle 14, the OLED of the pixel circuit emits required brightness based on the programming data. Finally, during the relaxing cycle 16, the pixel circuit is OFF or biased with reverse polarity of the driving cycle 14. Consequently, the aging effect causes by the driving cycle 14 is annealed. This prevents aging accumulation effect from one frame to the other frame, and so the pixel life time increases significantly.

To obtain the wanted average brightness, the pixel circuit is programmed for a higher brightness since it is OFF for a fraction of frame time (i.e., relaxing cycle 16). The programming brightness based on wanted one is given by:

$$L_{CP} = \left(\frac{\tau_F}{\tau_F - \tau_R}\right) L_N \tag{1}$$

where "$L_{CP}$" is a compensating luminance, "$L_N$" is a normal luminance, "$\tau_R$" is a relaxation time (16 of FIG. 1), and "$\tau_P$" is a frame time (10 of FIG. 1).

As described below, letting the pixel circuit relax for a fraction of each frame can control the aging of the pixel, which includes the aging of driving devices (i.e., TFTs 24 and 26 of FIG. 2), the OLED (e.g., 22 of FIG. 1), or combinations thereof.

Figure 2:
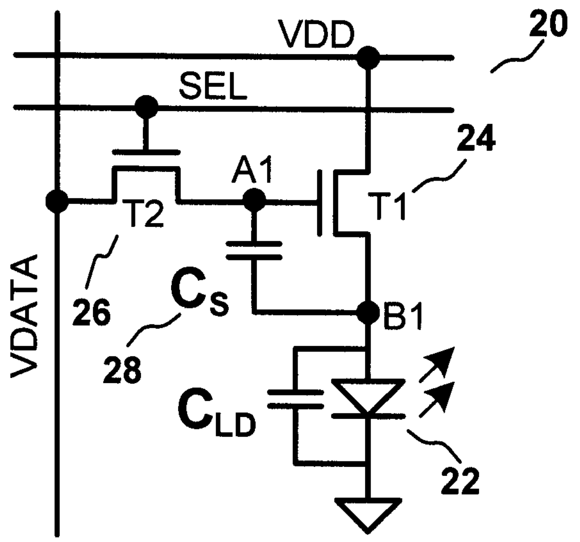
FIG. 2 is a diagram illustrating an example of a pixel circuit to which the timing schedule of FIG. 1 is suitably applied.

FIG. 2 illustrates an example of a pixel circuit to which the timing schedule of FIG. 1 is applicable. The pixel circuit 20 of FIG. 2 is a 2-TFT pixel circuit. The pixel circuit 20 includes an OLED 22, a drive TFT 24, a switch TFT 26, and a storage capacitor 28. Each of the TFTs 24 and 26 have a source terminal, a drain terminal and a gate terminal. In FIG. 2, $C_{LD}$ represents OLED capacitance. The TFTs 24 and 26 are n-type TFTs. However, it would be appreciated by one of ordinary skill in the art that the driving schemed of FIG. 1 is applicable to a complementary pixel circuit having p-type transistors or the combination of n-type and p-type transistors.

One terminal of the drive TFT 24 is connected to a power supply line VDD, and the other terminal of the drive TFT 24 is connected to one terminal of the OLED 22 (node B1). One terminal of the switch TFT 26 is connected to a data line VDATA, and the other terminal of the switch TFT 26 is connected to the gate terminal of the drive TFT 24 (node A1). The gate terminal of the switch TFT 26 is connected to a select line SEL. One terminal of the storage capacitor 28 is connected to node A1, and the other terminal of the storage capacitor 28 is connected to node B1.

Figure 3:
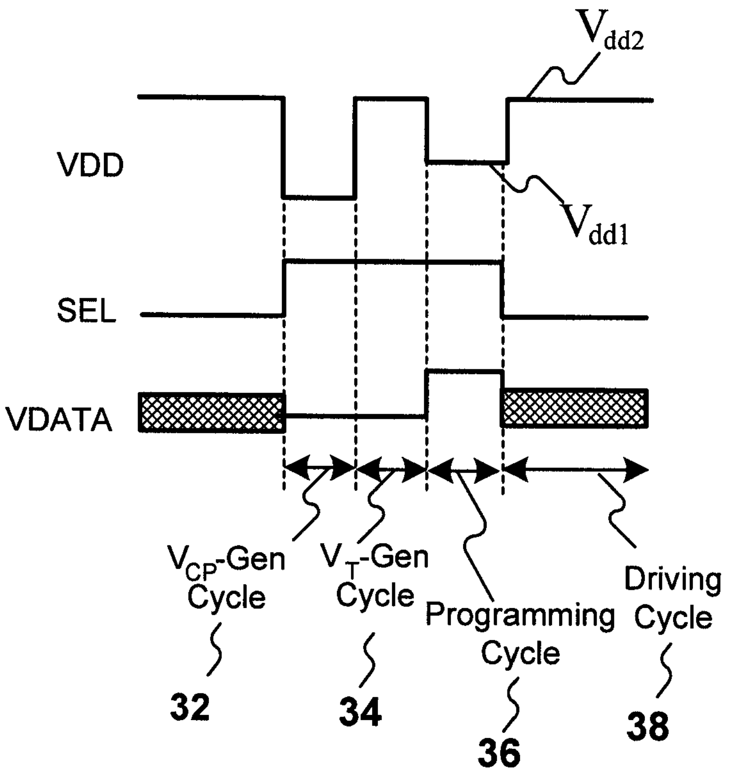
FIG. 3 is an exemplary timing chart for a compensating driving scheme in accordance with an embodiment of the present invention.

FIG. 3 illustrates an exemplary time schedule for a compensating driving scheme in accordance with an embodiment of the present invention, which is applicable to the pixel of FIG. 2. In FIG. 3, "32" represents "$V_{CP}$-Gen cycle", "34" represents "$V_T$-Gen cycle", "36" represents "programming cycle" and associated with the programming cycle 12 of FIG. 1, and "38" represents "driving cycle" and associated with the driving cycle 14 of FIG. 1.

The waveforms of FIG. 3 are used, for example, in the cycles 12 and 14 of FIG. 1. During the $V_{CP}$-Gen cycle 32, a voltage is developed across the gate-source voltage of a drive TFT (e.g., 24 of FIG. 2). During the $V_T$-Gen cycle 34, voltage at node B1 becomes $-V_T$ of the drive TFT (e.g., 24 of FIG. 2) where $V_T$ is the threshold voltage of the drive TFT (e.g., 24 of FIG. 2). During the programming cycle 36, node A1 is charged to $V_P$ which is related to Lcp of (1).

Referring to FIGS. 2 and 3, during the first operating cycle 32 ("$V_{CP}$-Gen"), VDD changes to a negative voltage ($-V_{CPB}$) while VDATA has a positive voltage ($V_{CPA}$). Thus, node A1 is charged to $V_{CPA}$, and node B1 is discharged to $-V_{CPB}$. $V_{CPA}$ is smaller than $V_{TO}+V_{OLEDO}$, where the $V_{TO}$ is the threshold voltage of the unstressed drive TFT 24 and the $V_{OLEDO}$ is the ON voltage of the unstressed OLED 22.

During the second operating cycle 34 ("$V_T$-Gen"), VDD changes to $V_{dd2}$ that is a voltage during the driving cycle 38. As a result, node B1 is charged to the point at which the drive TFT 24 turns off. At this point, the voltage at node B1 is ($V_{CPA}$-$V_T$) where $V_T$ is the threshold of the drive TFT 24, and the voltage stored in the storage capacitor 28 is the $V_T$ of the drive TFT 24.

During the third operating cycle 36 ("programming cycle"), VDATA changes to a programming voltage, $V_{CPA}+V_p$. VDD goes to Vdd1 which is a positive voltage. Assuming that the OLED capacitance ($C_{LD}$) is large, the voltage at node B1 remains at $V_{CPA}$-$V_T$. Therefore, the gate-source voltage of the drive TFT 24 ideally becomes $V_p+V_T$. Consequently, the pixel current becomes independent of ($\Delta V_T+\Delta V_{OLED}$) where $\Delta V_T$ is a shift of the threshold voltage of the drive TFT 24 and $\Delta V_{OLED}$ is a shift of the ON voltage of the OLED 22.

Figure 4:
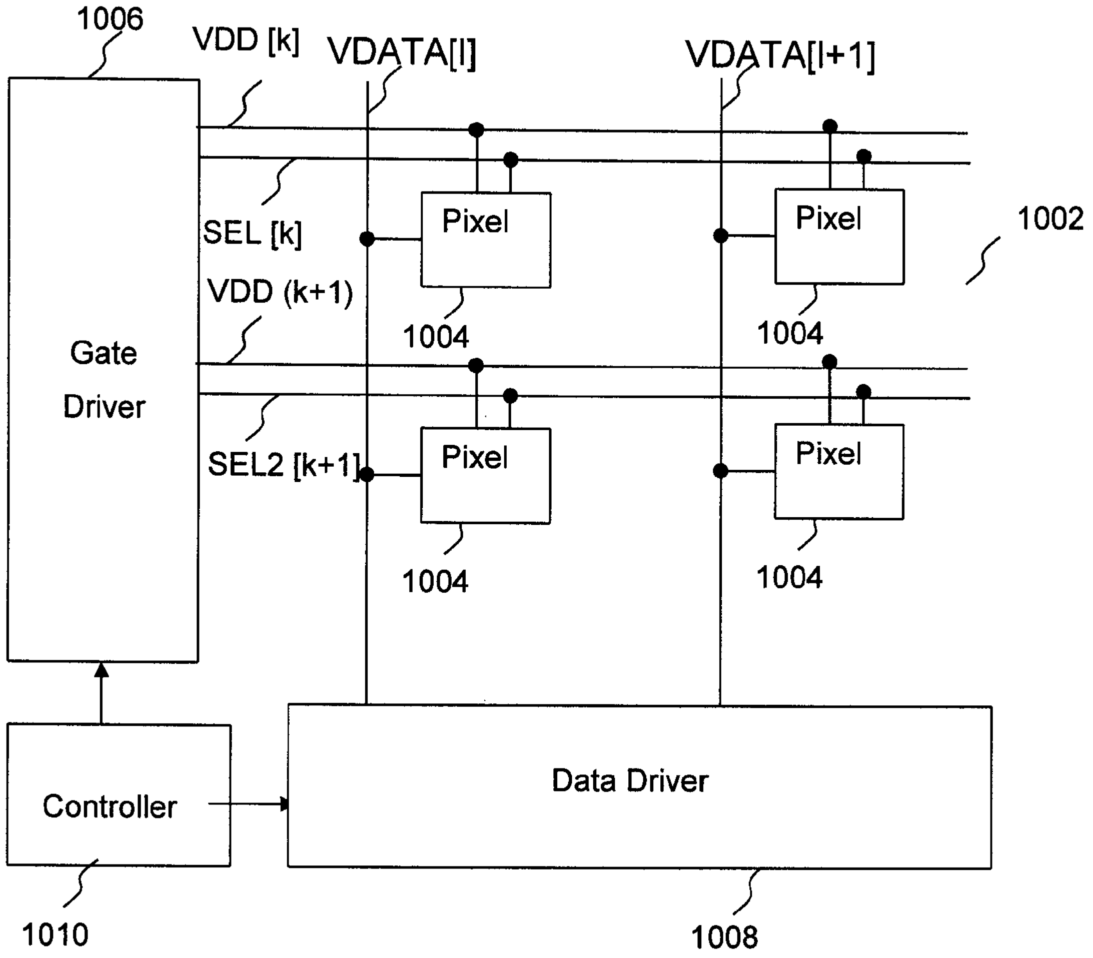
FIG. 4 is a diagram illustrating an example of a display system for implementing the timing schedule of FIG. 1 and the compensating driving scheme of FIG. 3.

FIG. 4 illustrates an example of a display system for implementing the timing schedule of FIG. 1 and the compensating driving scheme of FIG. 3. The display system 1000 includes a pixel array 1002 having a plurality of pixels 1004. The pixel 1004 corresponds to the pixel 20 of FIG. 2. However, the pixel 1004 may have structure different from that of the pixel 20. The pixels 1004 are arranged in row and column. In FIG. 4, the pixels 1004 are arranged in two rows and two columns. The number of the pixels 1004 may vary in dependence upon the system design, and does not limited to four. The pixel array 1002 is an active matrix light emitting display, and may form an AMOLED display.

"SEL[i]" is an address line for the ith row (i=k, k+1 . . . ) and corresponds to SEL of FIG. 2. "VDD[i]" is a power supply line for the ith row (i= . . . k, k+1 . . . ) and corresponds to VDD of FIG. 2. "VDATA[j]" is a data line for the jth row (i= . . . 1, 1+1 . . . ) and corresponds to VDATA of FIG. 2.

A gate driver 1006 drives SEL[i] and VDD[i]. The gate driver 1006 includes an address driver for providing address signals to SEL[i]. A data driver 1008 generates a programming data and drives VDATA[j]. The controller 1010 controls the drivers 1006 and 1008 to drive the pixels 1004 based on the timing schedule of FIG. 1 and the compensating driving scheme of FIG. 3.

Figure 5:
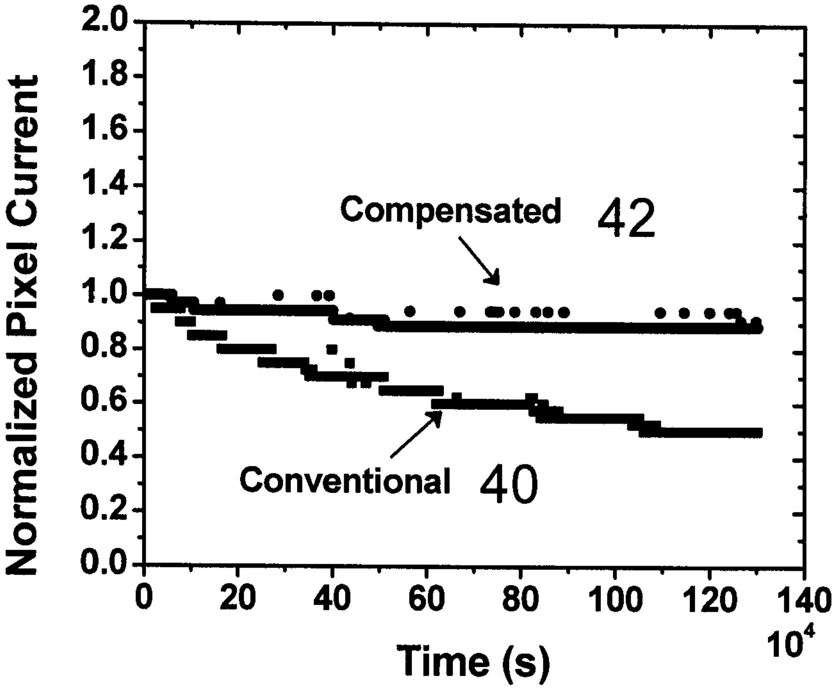
FIG. 5 is a graph illustrating measurement results for a conventional driving scheme and the compensating driving scheme of FIG. 3.

FIG. 5 illustrates lifetime results for a conventional driving scheme and the compensating driving scheme. Pixel circuits of FIG. 2 are programmed for 2 μA at a frame rate of ~60 Hz by using the conventional driving scheme (40) and the compensating driving scheme (42). The compensating driving scheme (42) is highly stable, reducing the total aging error to less than 10%. By contrast, in the conventional driving scheme (40), while the pixel current becomes half of its initial value after 36 hours, the aging effects result in a 50% error in the pixel current over the measurement period. The total shift in the OLED voltage and threshold voltage of the drive TFT (i.e., 24 of FIG. 2), $\Delta(V_{OLED}+V_T)$, is ~4 V.

Figure 6:
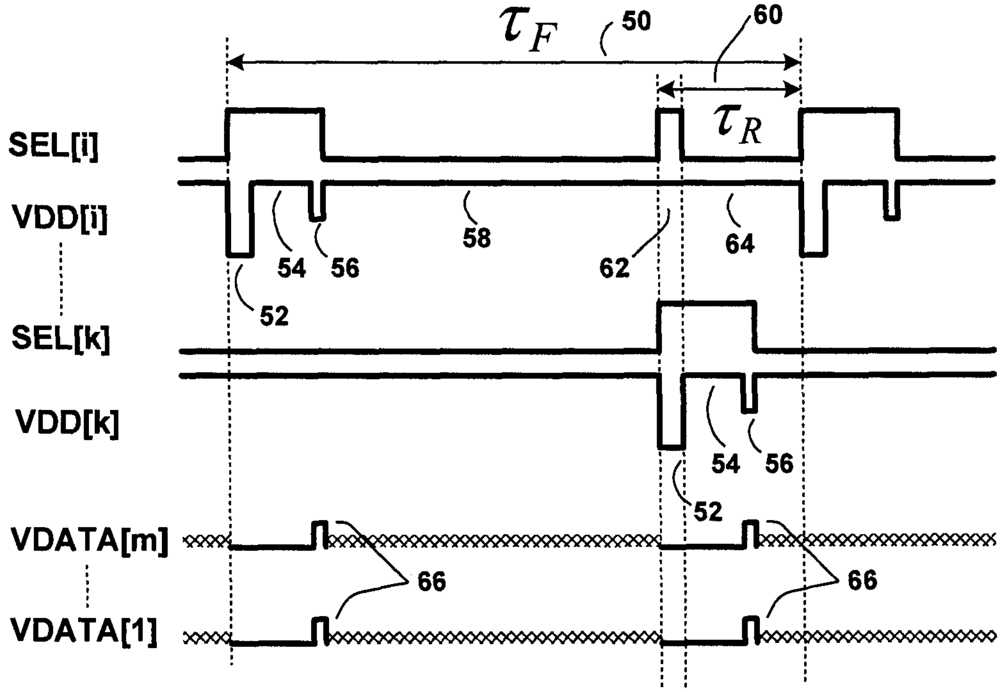
FIG. 6 is a timing chart illustrating an example of frames based on the timing schedule of FIG. 1 and the compensating driving scheme of FIG. 3.

FIG. 6 illustrates an example of frames using the timing schedule of FIG. 1 and the compensating driving scheme of FIG. 3.

In FIG. 6, "i" represents the ith row in a pixel array, "k" represents the kth row in the pixel array, "m" represents the mth column in the pixel array, and "1" represents the 1th column in the pixel array. The waveforms of FIG. 6 are applicable to the display system 1000 of FIG. 4 to operate the pixel array 1002 of FIG. 4. It is assumed that the pixel array includes more than one pixel circuit 20 of FIG. 2.

In FIG. 6, "50" represents a frame for the ith row and corresponds to "10" of FIG. 1, "52" represents "$V_{CP}$-Gen cycle" and corresponds to "32" of FIG. 3, "54" represents "$V_T$-Gen cycle" and corresponds to "34" of FIG. 3, and "56" represents "programming cycle" and corresponds to "36" of FIG. 3. In FIG. 6, "58" represents "driving cycle" and corresponds to "38" of FIG. 3. In FIG. 6, "66" represents the values of the corresponding VDATA lines during the operating cycle 56.

In FIG. 6, "60" represents a relaxing cycle for the ith row and corresponds to "16" of FIG. 1. The relaxing cycle 60 includes a first operating cycle "62" and a second operating cycle "64". During the relaxing cycle 60 for the ith row, SEL[i] is high at the first operating cycle 62 and then is low at the second operating cycle 64. During the frame cycle 62, node A1 of each pixel at the ith row is charged to a certain voltage, such as, zero. Thus, the pixels are OFF during the frame cycle 64. "$V_{CP}$-Gen cycle" 52 for the kth row occurs at the same timing of the first operating cycle 62 for the ith row.

During the first operating cycle 52 for the kth row, which is the same as the first operating cycle 62 for the ith row, SEL[i] is high, and so the storage capacitors of the pixel circuits at the ith row are charged to $V_{CPA}$. VDATA lines have $V_{CPA}$. Considering that $V_{CPA}$ is smaller than $V_{OLED0}+V_{T0}$, the pixel circuits at the ith row are OFF at the second operating cycle 64 and also the corresponding drive TFTs (24 of FIG. 2) are negatively biased resulting in partial annealing of the $V_T$-shift at the cycle 64.

Figure 7:
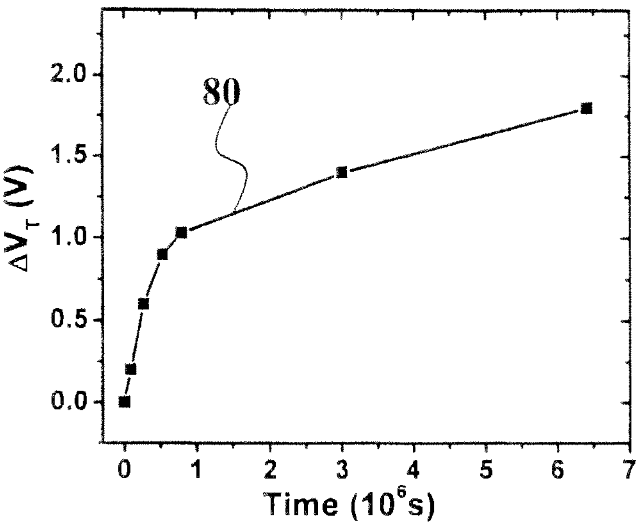
FIG. 7 is a graph illustrating the measurement result of threshold voltage shift based on the compensating driving scheme of FIG. 6.
Figure 8:
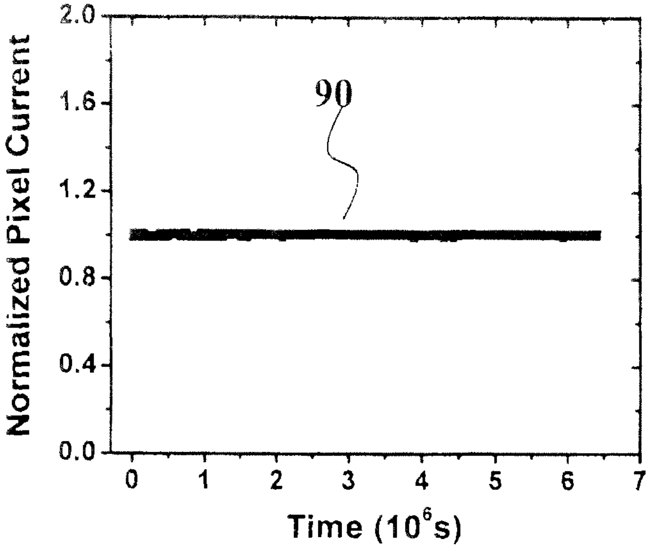
FIG. 8 is a graph illustrating the measurement result of OLED current based on the compensating driving scheme of FIG. 6.

FIGS. 7 and 8 illustrate results of a longer lifetime test for a pixel circuit employing the timing cycles of FIG. 6. To obtain data of FIGS. 7 and 8, a pixel array having more than one pixel 20 of FIG. 2 was used.

In FIG. 7, "80" represents the measurement result of the shift in the threshold voltage of the drive transistor (i.e., 24 of FIG. 2). The result signifies that the above method and results in a highly stable pixel current even after 90 days of operation. Here, the pixel of FIG. 2 is programmed for 2.5 μA to compensate for the luminance lost during the relaxing cycle. The $\Delta(V_{OLEd}+V_T)$ is extracted once after a long timing interval (few days) to not disturb pixel operation. It is clear that the OLED current is significantly stable after 1500 hours of operation which is the results of suppression in the aging of the drive TFT (i.e., 24 of FIG. 2) as shown in FIG. 7.

In FIG. 8, "90" represents the measurement result of OLED current of the pixel (i.e., 20 of FIG. 2) over time. The result depicted in FIG. 8 confirms that the enhanced timing diagram suppresses aging significantly, resulting in longer lifetime. Here, $\Delta(V_{OLED}+V_T)$ is 1.8 V after a 90 days of operation, whereas it is 3.6 V for the compensating driving scheme without the relaxing cycle after a shorter time.

Figure 9:
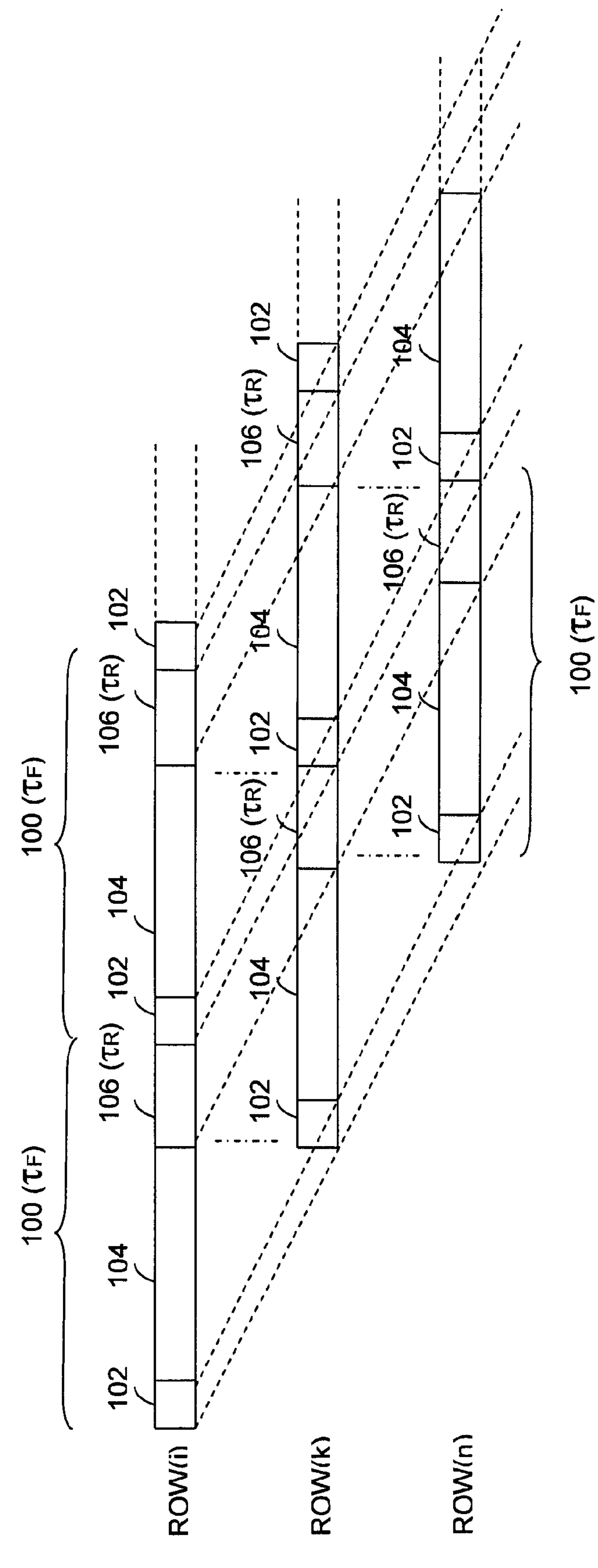
FIG. 9 is a diagram illustrating an example of a driving scheme applied to a pixel array, in accordance with an embodiment of the present invention.

FIG. 9 is a diagram illustrating an example of the driving scheme applied to a pixel array, in accordance with an embodiment of the present invention. In FIG. 9, each of ROW (i), ROW(k) and ROW (n) represents a row of the pixel array. The pixel array may be the pixel array 1002 of FIG. 4. The frame 100 of FIG. 9 includes a programming cycle 102, a driving cycle 104, and a relaxing cycle 106, and has a frame time "$\tau_F$". The programming cycle 102, the driving cycle 104, and the relaxing cycle 106 may correspond to the operation cycles 12, 14, and 16 of FIG. 1, respectively. The programming cycle 102 may include the operating cycles 32, 34 and 36 of FIG. 3. The relaxing cycle 106 may be similar to the relaxing cycle 60 of FIG. 6.

The programming cycle 102 for the kth row occurs at the same timing of the relaxing cycle 106 for the ith row. The programming cycle 102 for the nth row occurs at the same timing of the relaxing cycle 106 for the kth row.

Figure 10A:
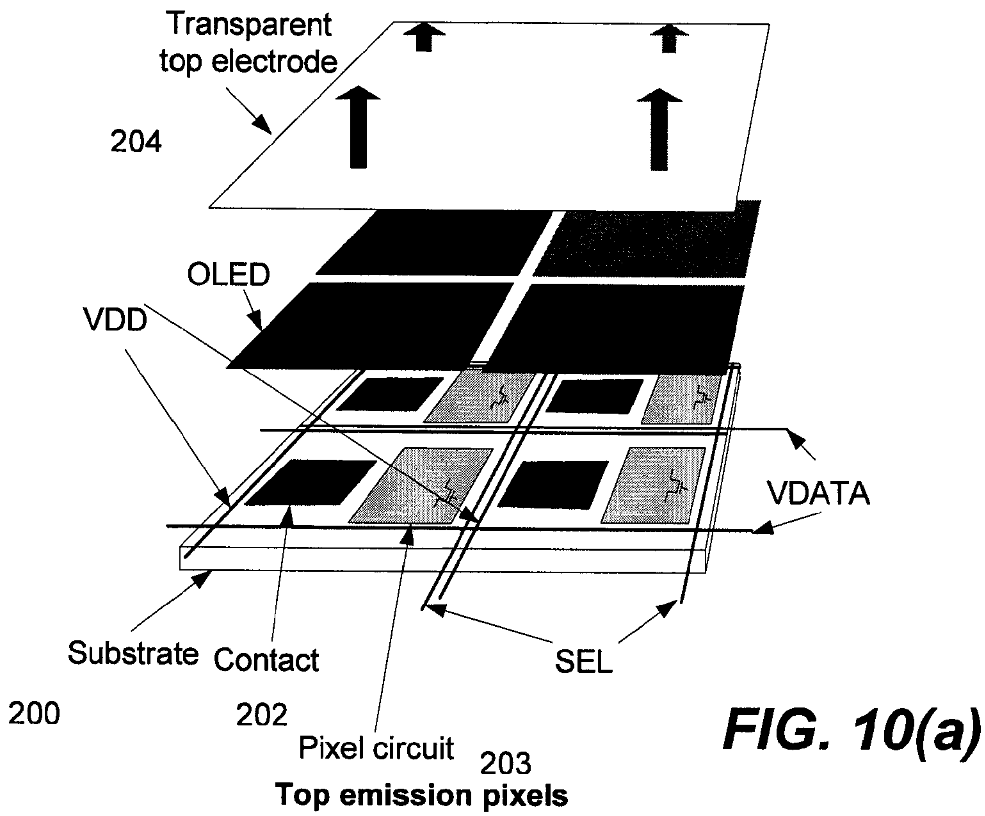
FIG. 10(*a*) is a diagram illustrating an example of array structure having top emission pixels applicable to the display system of FIG. 4.
Figure 10B:
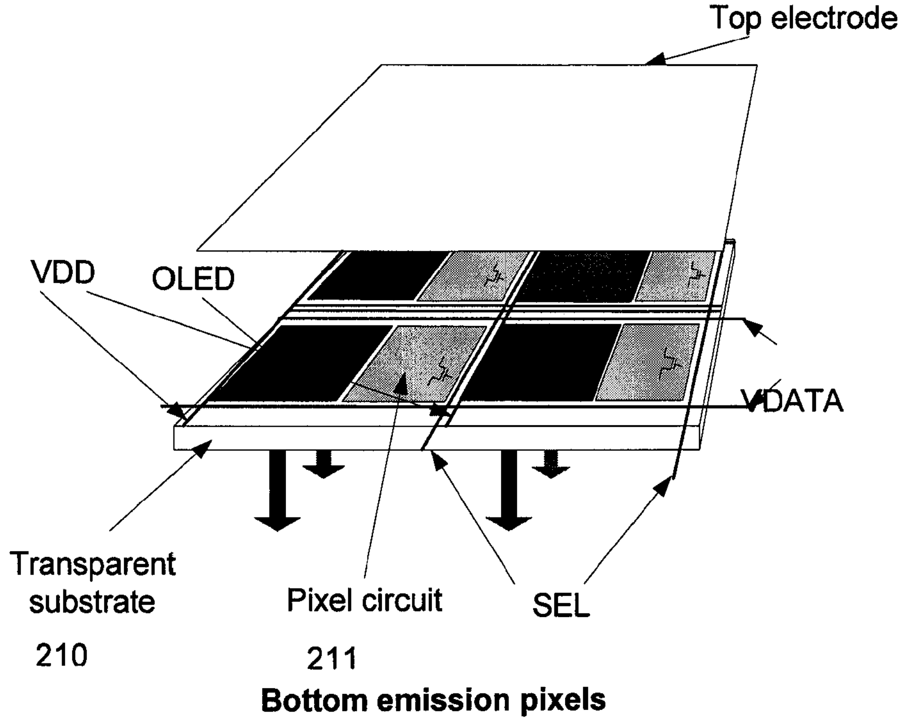

FIG. 10(*a*) illustrates an example of array structure having top emission pixels. FIG. 10(*b*) illustrates an example of array structure having bottom emission pixels. The pixel array of FIG. 4 may have the array structure of FIG. 10(*a*) or 10(*b*). In FIG. 10(*a*), 200 represents a substrate, 202 represents a pixel contact, 203 represents a (top emission) pixel circuit, and 204 represents a transparent top electrode on the OLEDs. In FIG. 10(*b*), 210 represents a transparent substrate, 211 represents a (bottom emission) pixel circuit, and 212 represents a top electrode. All of the pixel circuits including the TFTs, the storage capacitor, the SEL, VDATA, and VDD lines are fabricated together. After that, the OLEDs are fabricated for all pixel circuits. The OLED is connected to the corresponding driving transistor using a via (e.g., B1 of FIG. 2) as shown in FIGS. 10(*a*) and 10(*b*). The panel is finished by deposition of the top electrode on the OLEDs which can be a continuous layer, reducing the complexity of the design and can be used to turn the entire display ON/OFF or control the brightness.

In the above description, the pixel circuit 20 of FIG. 2 is used as an example of a pixel circuit for implementing the timing schedule of FIG. 1, the compensating driving schedule of FIG. 3, and the timing schedule of FIG. 6. However, it is appreciated that the above timing schedules of FIGS. 1, 3 and 6 are applicable to pixel circuits other than that of FIG. 2, despite its configuration and type.

Examples of the driving scheme, compensating and driving scheme, and pixel/pixel arrays are described in G. R. Chaji and A. Nathan, "Stable voltage-programmed pixel circuit for AMOLED displays," IEEE J. of Display Technology, vol. 2, no. 4, pp. 347-358, December 2006, which is hereby incorporated by reference.

One or more currently preferred embodiments have been described by way of example. It will be apparent to persons skilled in the art that a number of variations and modifications can be made without departing from the scope of the invention as defined in the claims.

What is claimed is:

1. A method of operating a pixel array having pixel circuits arranged in rows and columns, each of the pixel circuits including a switch, a select line connected to the switch, a drive transistor coupled to a data line via the switch and to a controllable power supply line, a light emitting device coupled to the drive transistor, and a storage capacitor coupled to the drive transistor, the method comprising:

programming a first of the pixel circuits responsive to driving the select line for the first pixel circuit from a first state to a second state to select the first pixel circuit for programming, the programming including:

during a first operating cycle, adjusting the controllable power supply line for the first pixel circuit to a first voltage while applying on the data line for the first pixel circuit a second voltage of opposite polarity to that of the first voltage;

responsive to the first operating cycle, during a second operating cycle, changing the controllable power supply line to a driving voltage corresponding to a voltage used to drive the light emitting device of the first pixel circuit, the driving voltage being different from the first voltage; and responsive to the second operating cycle, during a programming cycle, changing the controllable power supply line for the first pixel circuit to a third voltage different from the first voltage and the driving voltage while applying at least a programming voltage on the data line for the first pixel circuit.

2. The method of claim 1, wherein the switch and the drive transistor are n-type thin-film transistors, and the first voltage is negative, and the second and third voltages are positive.

3. The method of claim 1, wherein the first voltage is negative to develop a negative voltage at a second node between a source terminal of the drive transistor and a first terminal of the light emitting device, and wherein the second voltage is positive to charge a first node between a gate of the drive transistor and a first terminal of the storage capacitor to the second voltage during the first operating cycle.

4. The method of claim 3, wherein during the second operating cycle the second node is charged until the drive transistor turns off, thereby causing a threshold voltage of the drive transistor to be stored in the storage capacitor.

5. The method of claim 4, wherein during the programming cycle, a voltage stored in the storage capacitor includes a threshold voltage of the drive transistor and the programming voltage provided from the data line.

6. The method of claim 1, wherein the second voltage is smaller than a threshold voltage of the drive transistor in an unstressed state and an ON voltage of the light emitting device in an unstressed state.

7. The method of claim 1, further comprising:

programming a second of the pixel circuits responsive to driving the select line for the second pixel circuit from a first state to a second state to select the second pixel circuit for programming, the programming including:

during a first operating cycle, adjusting the controllable power supply line for the second pixel circuit to a first voltage while applying on the data line for the second pixel circuit a second voltage of opposite polarity to that of the first voltage;

responsive to the first operating cycle, during a second operating cycle, changing the controllable power supply line to a driving voltage corresponding to a voltage used to drive the light emitting device of the second pixel circuit, the driving voltage being different from the first voltage; and responsive to the second operating cycle, during a programming cycle, changing the controllable power supply line for the second pixel circuit to a third voltage different from the first voltage and the driving voltage while applying at least a programming voltage on the data line for the second pixel circuit.

8. The method of claim 7, wherein the first pixel circuit and the second pixel circuits are in different rows of the pixel array.

9. The method of claim 7, wherein each of the controllable power supply lines for the first and second pixel circuits intersects both of the data lines for the first and second pixel circuits.

* * * * *